United States Patent [19]
Jondrow

[11] Patent Number: 6,152,414
[45] Date of Patent: Nov. 28, 2000

[54] COMPUTER DOCKING STATION WITH ANTI-SLIP MOUNT

[75] Inventor: Timothy J Jondrow, Corvallis, Oreg.

[73] Assignee: Hewlett-Packard Company, Palo Alto, Calif.

[21] Appl. No.: 09/061,668

[22] Filed: Apr. 16, 1998

[51] Int. Cl.[7] ................................................. A47B 91/00

[52] U.S. Cl. ................................ 248/346.03; 248/205.8; 248/363; 248/918

[58] Field of Search ........................ 248/346.03, 346.01, 248/918, 362, 363, 205.5, 205.7, 205.8, 206.3, 500

[56] References Cited

U.S. PATENT DOCUMENTS

| | | | |
|---|---|---|---|
| 4,813,640 | 3/1989 | Perentin | 248/205.8 |
| 5,045,842 | 9/1991 | Galvin | 340/709 |
| 5,701,347 | 12/1997 | Danils et al. | 248/346.03 X |

*Primary Examiner*—Ramon O. Ramirez

[57] ABSTRACT

A computer docking station for a portable computer has an enclosure to mate physically and electrically with the portable computer. The docking station has an anti-slip mechanism to hold the enclosure to a surface. The anti-slip mechanism has at least one suction cup with a stub portion hidden within the enclosure and a cup portion that extends out through an aperture in the enclosure. A shaft with an eccentric cam section is connected to the stub portion to cause the stub portion to move in opposing first and second directions when the shaft is rotated. A knob is connected to the shaft and exposed externally of the enclosure so that a user can turn the knob to rotate the shaft. When the user moves the knob to a lock position, the mechanism moves the stub portion in the first direction, drawing the stub portion inward relative to the enclosure aperture, thereby causing the cup portion to cup and form a cavity between itself and the surface. This action creates a suction force relative to the surface to hold the enclosure to the surface and to resist sliding of the enclosure over the surface during docking or undocking. To release the enclosure, the user moves the knob to an unlock position. The mechanism moves the stub portion in the second direction, pushing the stub portion toward the enclosure aperture, thereby causing the cup portion to flatten and release the suction force.

18 Claims, 3 Drawing Sheets

COMPUTER DOCKING STATION WITH ANTI-SLIP MOUNT

TECHNICAL FIELD

This invention relates to computer docking stations, and more particularly, to computer docking stations with a slip resistant mount.

BACKGROUND

Portable computers are widely used and a popular alternative to desktop computers. The ability to carry a powerful computing device that offers a full range of processing and communication functionality is very appealing to our mobile generation.

Despite these advantages, the portable computer fails to match the desktop computer in the area of user comfort and ergonomics. By necessity, portable computers are small, thin, lightweight machines that users can slide easily into their briefcases. As a result, the keyboards and displays are smaller and less ergonomically comfortable to use. While sensible for travel and portability, the portable computer has not been widely adopted as the computer of choice for primary office use.

The minor inconveniences of portable computers have been somewhat alleviated with the advent of docking stations. A docking station is a stationary unit that adapts a portable computer for use as a stationary desktop computer. Conventional docking stations physically interconnect with the portable computer and provide electronics and processing components to interface the portable computer with a large CRT monitor (e.g., VGA), a normal size or ergonomic keyboard, a mouse, and other peripherals (e.g., printer, CD-ROM drive, etc.). The docking station resides permanently on the user's desk.

When working at the desk, the user docks the portable computer at the docking station by physically loading the computer into a slot in the docking station. Once physically mated, the portable computer is electronically interfaced via the docking station to control the peripherals, such as the monitor, keyboard, CD-ROM drive, printer, and so forth. In this manner, the portable computer operates as the central processing unit (CPU), with the docking station providing support capabilities for the peripherals. When the user leaves the desk, he/she simply undocks the portable computer from the docking station and carries it along for portable use.

One problem with conventional docking stations concerns the undesired sliding of the computer and docking station during the physical docking and undocking process. To dock (or undock) the computer, the user must exert a force of sufficient magnitude to cause both physical and electrical interconnect (or disconnect). However, docking stations are typically lightweight. The force exerted by the user on the computer usually causes the docking station to slide across the desk surface, unless the docking station is held in place or a counter force is applied to it.

Elaborate docking stations incorporate a self-attaching mechanism that mechanically draws in, or releases, the notebook computer. However, such mechanisms are costly and hence, not widely adopted. For instance, low cost docking stations like "port replicators" for smaller notebook computers are not equipped with the self-attaching mechanism due to prohibitive cost.

The inventor has recognized the sliding problem and has developed a docking station with a low cost solution to help prevent or reduce the sliding problem.

SUMMARY

A computer docking station for a portable computer has an enclosure to mate physically and electrically with the portable computer. The enclosure contains a cable connection to interface the computer, when docked, with one or more peripherals. Processing and electronic components might also be implemented in the enclosure to support communications, memory access, and other functions on behalf of the portable computer.

The docking station also has an anti-slip mechanism to hold the enclosure to a surface, such as a desk top. The anti-slip mechanism resists movement of the enclosure relative to the surface when the portable computer is being docked and undocked.

In one implementation, the anti-slip mechanism comprises at least one suction cup that is mechanically actuated to hold the enclosure to the surface. More particularly, the suction cup has a stub portion hidden within the enclosure and a cup portion that extends out through an aperture in the enclosure. A shaft is connected to the stub portion of the suction cup. The shaft has an eccentric portion to move the stub portion in opposing first and second directions when the shaft is rotated back and forth to thereby mechanically actuate the suction cup between a released position and an activated position. A knob is connected to the shaft and exposed external of the enclosure so that a user can turn the knob to rotate the shaft.

Prior to docking, the user places the enclosure on a surface. When the user moves the knob to a lock position, the mechanism moves the stub portion in the first direction, drawing the stub portion inward relative to the enclosure aperture, thereby causing the cup portion to cup and form a cavity between itself and the surface. This action creates a suction force relative to the surface to hold the enclosure to the surface and to resist sliding of the enclosure over the surface during docking or undocking.

To release the enclosure, the user moves the knob to an unlock position. The mechanism moves the stub portion in the second direction, pushing the stub portion toward the enclosure aperture, thereby causing the cup portion to flatten and release the suction force.

The anti-slip mechanism may be used with other types of computing devices, such as the portable computers themselves.

BRIEF DESCRIPTION OF THE DRAWINGS

FIG. 2 shows suction cups on the docking station.

DETAILED DESCRIPTION

Figure 1:
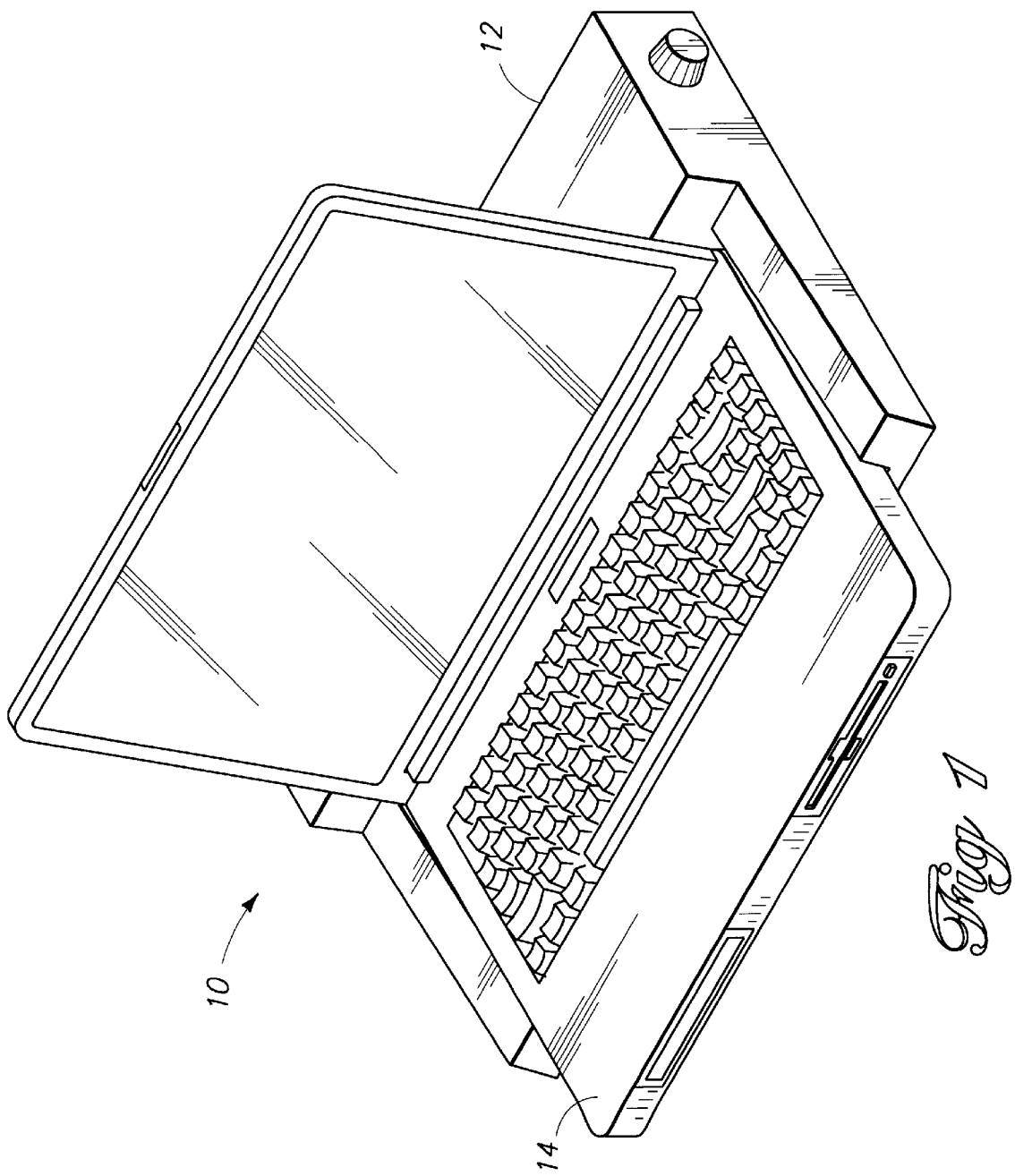
FIG. 1 is a perspective view of a portable computer docked within a docking station.

FIG. 1 shows a computer system 10 having a docking station 12 and a portable computer 14. The portable computer 14 is illustrated as a laptop computer and the docking station 12 is sized and shaped with a docking slot to receive the laptop computer. The portable computer 14 can be loaded or "docked" within the docking station 12 in which the computer is physically and electrically mated with the docking station, or removed or "undocked" from the docking station.

The docking station and portable computer can be implemented as other types of computing devices. For instance, the docking station may be implemented as a "port replicator" for a notebook computer or sub-notebook computer or as a "cradle" for a palmtop computer. As used herein, the term "docking station" is intended to broadly apply to various forms of bases ranging from a sophisticated docking station having internal processing and electronic components, cable interconnects, and a power supply unit, to an unsophisticated port replicator that simply provides a means to manage cable connections.

Figure 2:
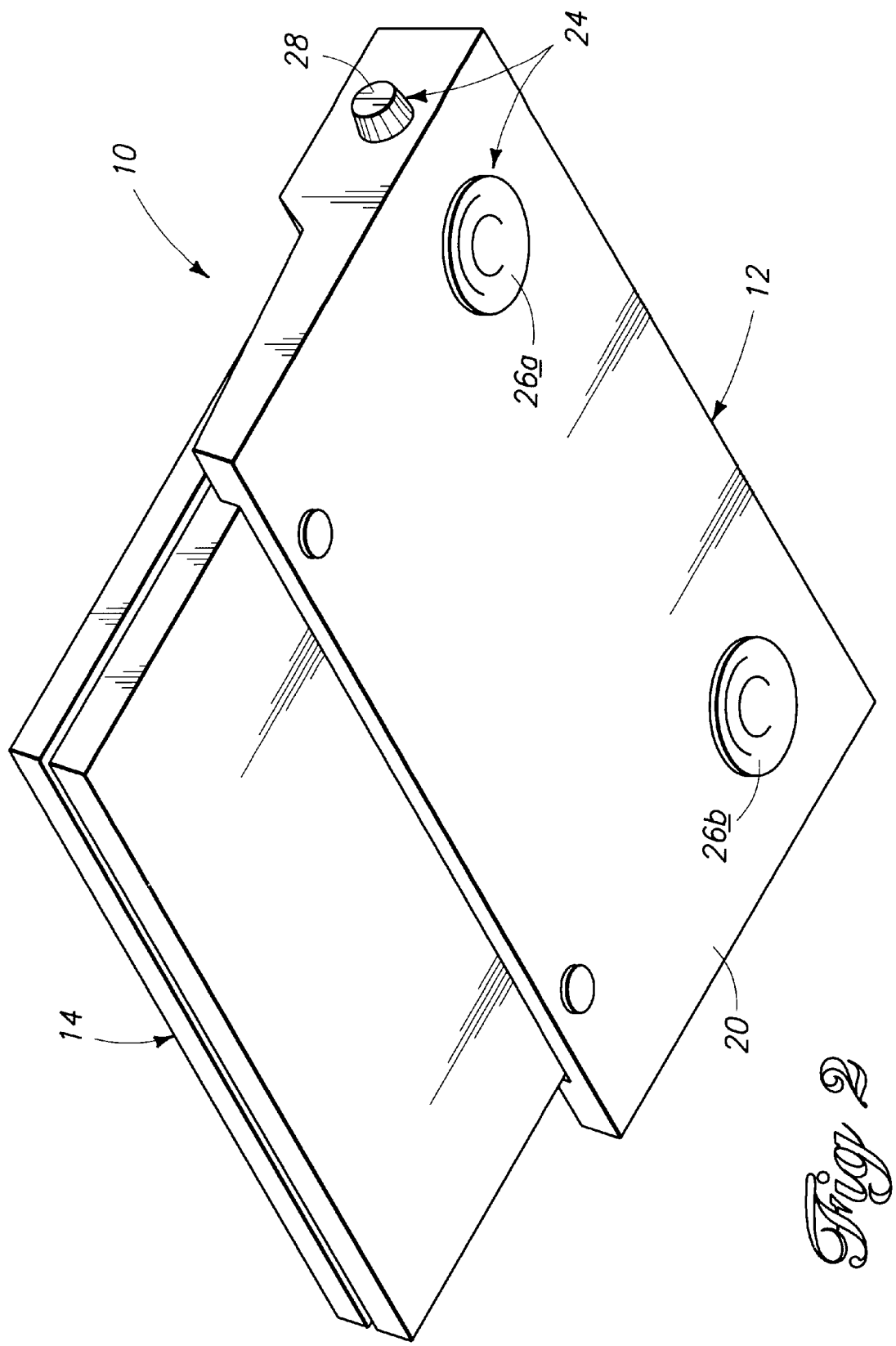
FIG. 2 is a bottom perspective view of the portable computer docked in the docking station

FIG. 2 shows the underside of the docking station 12, with the computer 14 docked therein. The docking station 14 comprises an enclosure 20 formed of hard plastic or metal. The enclosure defines a docking slot into which the portable computer 14 can be inserted.

The docking station 12 further has an anti-slip mechanism 24 mounted in the enclosure 20. The anti-slip mechanism 24 holds the enclosure to a surface, such as a desk top, and resists movement of the enclosure relative to the surface when the portable computer 14 is being docked and undocked. The anti-slip mechanism 24 includes a pair of elastomer suction cups 26(*a*) and 26(*b*). The suction cups 26 are suction-mounted to the surface to hold the enclosure in place during docking and undocking. The suction cups exert enough holding force to counteract the force exerted by the user when inserting the laptop computer 14 into the docking slot, or removing the computer from the docking slot.

According to one implementation, the suction cups 26(*a*) and 26(*b*) are mechanically actuated to move between a released position and an activated position. A knob 28, exposed externally of the enclosure 20, is connected to an interior mechanism (e.g., shaft) that moves the suction cups 26(*a*) and 26(*b*) between the released and activated positions.

Figure 3:
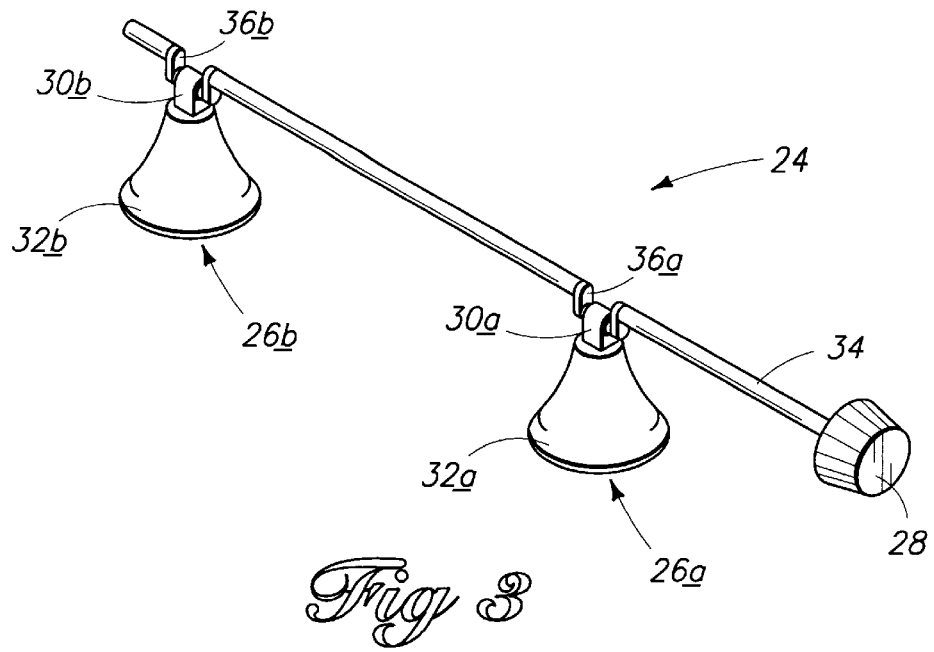
FIG. 3 is a diagrammatic illustration of an anti-slipping mechanism incorporated into the docking station.

FIG. 3 shows one implementation of the anti-slip mechanism 24 in more detail. It includes the pair of suction cups 26(*a*) and 26(*b*). Each suction cup 26(*a*), 26(*b*) has a stub portion 30(*a*), 30(*b*) that remains hidden within the enclosure 20 (not shown in FIG. 3) and a cup portion 32(*a*), 32(*b*) that extends out through an aperture in the enclosure.

A shaft 34 is connected to the suction cups 26(*a*) and 26(*b*). The shaft 34 is rotatably connected within the enclosure 20 such that the shaft is held in position, but permitted to rotate. The shaft 34 has eccentric cams 36(*a*) and 36(*b*) connected to the stub portions 30(*a*) and 30(*b*) of the suction cups 26(*a*) and 26(*b*). The knob 28 is connected to the shaft 34 and exposed externally of the enclosure, as shown in FIG. 2. When the user turns the knob 28 one way, the shaft 34 and cams 36 rotate to move the stub portions 30(*a*) and 30(*b*) in a first direction. When the user turns the knob 28 the other way, the shaft 34 and cams 36 rotate back to move the stub portions 30(*a*) and 30(*b*) in an opposing second direction.

In the interest of space, however, a linear shaft may not be appropriate for some docking stations. Other mechanisms may be substituted for the shaft, such as levers, gears, or other cam-like mechanisms. For instance, the docking station may be equipped with two knobs on opposing sides, one for each suction cup, with internal cam-like mechanisms interconnecting the knobs and suction cups. Furthermore, the illustrated implementation is purely mechanical. In other implementations, an electromechanical mechanism may be employed, such as an electronically actuated solenoid to move the suction cups.

Figure 4:
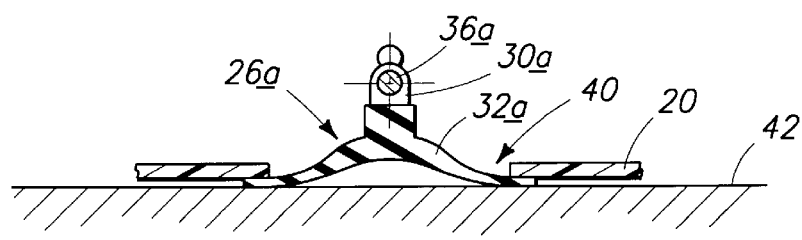
FIG. 4 is a cross-section of the suction cup within the enclosure in a locked position.
Figure 5:
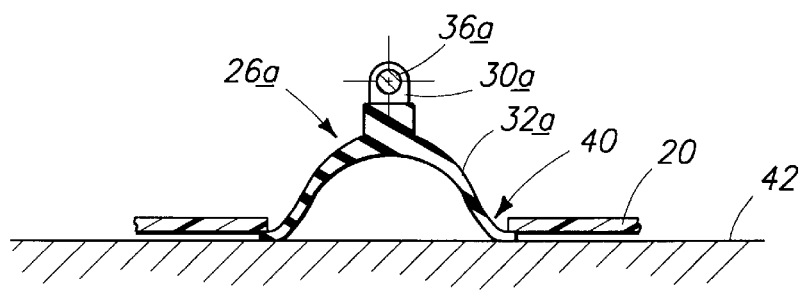
FIG. 5 is a cross-section of the suction cup within the enclosure in an unlocked position.

FIGS. 4 and 5 illustrate the anti-slip mechanism 24 in two different positions: a released position (FIG. 4) and an activated position (FIG. 5). More specifically, FIGS. 4 and 5 shows one of the suction cups, say cup 26(*a*), in cross-section to illustrate the two positions. The other suction cup moves correspondingly, and is thus is not illustrated.

In FIG. 4, the user-control knob 28 (not shown) is positioned at the unlocked position. The cam 36(*a*) moves the stub portion 30(*a*) of the suction cup 26(*a*) toward the enclosure aperture 40 (i.e., toward surface 42). The cup portion 32(*a*) is flattened, resulting in no or minimal suction force between the cup and the surface 42.

In FIG. 5, the user-control knob 28 (not shown) is turned to a locked position. The shaft is rotated, causing the cam 36(*a*) to move the stub portion 30(*a*) of the suction cup 26(*a*) away from the enclosure aperture 40 (i.e., away from surface 42). As the suction cup is drawn into the aperture 40, the cup portion 32(*a*) begins to cup and form a cavity between itself and the surface 42. This cupping action creates a suction force relative to the surface 42, which holds the enclosure 20 to the surface 42.

When the anti-slip mechanism is in the locked position, the user can dock or undock the portable computer from the docking station. The anti-slip mechanism resists sliding of the enclosure over the surface during docking or undocking.

Although the anti-slip mechanism has been described in the context of a docking station, the anti-slip mechanism may be implemented into the portable computer. In this manner, a user could attach the portable computer to a surface for use and the anti-slip mechanism would prevent slippage of the portable computer over the surface.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A docking station for a portable computer, comprising:
   an enclosure configured to dock the portable computer; and
   an anti-slip mechanism to hold the enclosure to a surface and to resist movement of the enclosure relative to the surface when the portable computer is being docked and undocked.

2. A docking station as recited in claim 1, wherein the anti-slip mechanism comprises at least one suction cup.

3. A docking station as recited in claim 1, wherein the anti-slip mechanism comprises at least one suction cup having a cup portion and a stub portion, the stub portion being mounted within the enclosure and the cup portion extending through an aperture in the enclosure to contact the surface.

4. A docking station as recited in claim 1, wherein the anti-slip mechanism comprises at least one mechanically actuated suction cup that is movable between a released position and an activated position, in which the activated position creates a suction force securing the suction cup to the surface.

5. A docking station as recited in claim 1, wherein the anti-slip mechanism comprises:
   at least one suction cup having a cup portion and a stub portion; and
   an eccentric cam connected to the stub portion of the suction cup to move the stub portion between a released position and an activated position, wherein when the cam moves the stub portion to the released position, the cup portion is flattened and creates minimal suction force relative to the surface, and when the cam moves the stub portion to the activated position, the cup portion is cupped to create a suction force relative to the surface.

6. A docking station for a portable computer, comprising:

an enclosure configured to dock the portable computer;

an anti-slip mechanism to hold the enclosure to a surface and to resist movement of the enclosure relative to the surface when the portable computer is being docked and undocked; and wherein the anti-slip mechanism comprises:

at least one suction cup having a cup portion and a stub portion;

an eccentric cam connected to the stub portion of the suction cup to move the stub portion between a released position and an activated position, wherein when the cam moves the stub portion to the released position, the cup portion is flattened and creates minimal suction force relative to the surface, and when the cam moves the stub portion to the activated position, the cup portion is cupped to create a suction force relative to the surface; and a shaft connected to the eccentric cam so that rotation of the shaft causes the cam to move the stub portion between the released position and the activated position.

7. A docking station as recited in claim 6, wherein the anti-slip mechanism further comprises a knob connected to the shaft and exposed external of the enclosure so that a user can turn the knob to cause rotation of the shaft.

8. A docking station for a portable computer, comprising:

an enclosure configured to dock a portable computer, the enclosure having an aperture;

at least one suction cup having a stub portion within the enclosure and a cup portion that extends out through the aperture in the enclosure;

a mechanism connected to the stub portion of the suction cup to mechanically actuate the suction cup between a released position and an activated position;

wherein when the suction cup is placed in the activated position, the mechanism moves the stub portion in a first direction causing the cup portion to cup and create a suction force relative to a surface; and wherein when the suction cup is placed in the released position, the mechanism moves the stub portion in a second direction causing the cup portion to flatten and release the suction force.

9. A docking station for a portable computer, comprising:

an enclosure configured to dock a portable computer, the enclosure having an aperture;

at least one suction cup having a stub portion within the enclosure and a cup portion that extends out through the aperture in the enclosure;

a mechanism connected to the stub portion of the suction cup to mechanically actuate the suction cup between a released position and an activated position;

wherein when the suction cup is placed in the activated position, the mechanism moves the stub portion in a first direction causing the cup portion to cup and create a suction force relative to a surface;

wherein when the suction cup is placed in the released position, the mechanism moves the stub portion in a second direction causing the cup portion to flatten and release the suction force; and wherein the mechanism comprises a shaft connected to the stub portion of the suction cup, the shaft having an eccentric portion to cause the stub portion to move in the first and second direction when the shaft is rotated.

10. A docking station as recited in claim 9, wherein the mechanism further comprises knob connected to the shaft and exposed external of the enclosure so that a user can turn the knob to cause rotation of the shaft.

11. A computing assembly comprising:

a computing device;

an anti-slip mechanism to hold the computing device to a surface and to resist movement of the computing device relative to the surface, the anti-slip mechanism comprising:

(1) at least one suction cup having a cup portion and a stub portion; and (2) an eccentric cam connected to the stub portion of the suction cup to move the stub portion between a released position and an activated position, wherein when the cam moves the stub portion to the released position, the cup portion is flattened and creates minimal suction force relative to the surface, and when the cam moves the stub portion to the activated position, the cup portion is cupped to create a suction force relative to the surface.

12. A computing assembly as recited in claim 11, wherein the anti-slip mechanism comprises at least one mechanically actuated suction cup that is movable between a released position and an activated position, in which the activated position creates a suction force securing the suction cup to the surface.

13. A computing assembly as recited in claim 11, wherein the anti-slip mechanism further comprises a shaft connected to the eccentric cam so that rotation of the shaft causes the cam to move the stub portion between the released position and the activated position.

14. A computing assembly as recited in claim 13, wherein the anti-slip mechanism further comprises a knob connected to the shaft and exposed external of the enclosure so that a user can turn the knob to cause rotation of the shaft.

15. A computer assembly, comprising:

a portable computer;

a docking station to dock the portable computer; and an anti-slip mechanism to hold the docking station to a surface and to resist movement of the docking station relative to the surface when the portable computer is being docked and undocked.

16. A computer assembly as recited in claim 15, wherein the anti-slip mechanism comprises at least one suction cup.

17. A computer assembly as recited in claim 15, wherein the anti-slip mechanism comprises at least one mechanically actuated suction cup that is movable between a released position and an activated position, in which the activated position creates a suction force securing the suction cup to the surface.

18. An anti-slip mechanism for a computing device, comprising:

at least one suction cup having a cup portion and a stub portion; and an eccentric cam connected to the stub portion of the suction cup to mechanically actuate the suction cup between a released position and an activated position, wherein when the cam moves the stub portion to the released position, the cup portion is flattened and creates minimal suction force relative to the surface, and when the cam moves the stub portion to the activated position the cup portion is cupped to create a suction force relative to a surface for holding the computing device to the surface.

* * * * *